H. H. LEUCHSENRING.
TOOTH SHADE GUIDE.
APPLICATION FILED APR. 17, 1916.
1,244,994.  Patented Oct. 30, 1917.
FIG. 1.
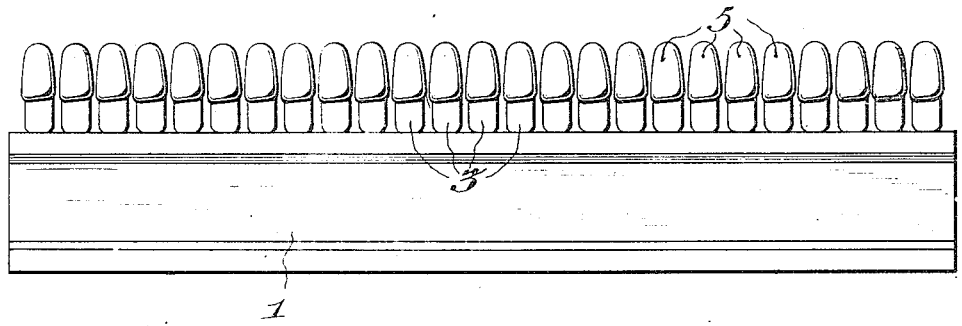
FIG. 2.
FIG. 3.  FIG. 4.  FIG. 5.  FIG. 6.
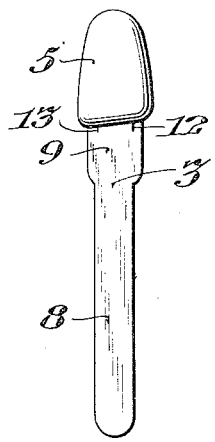 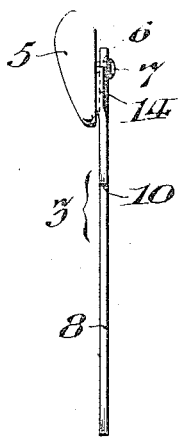 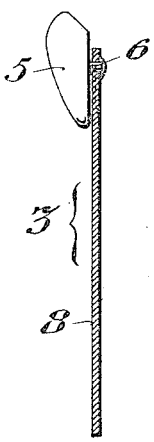 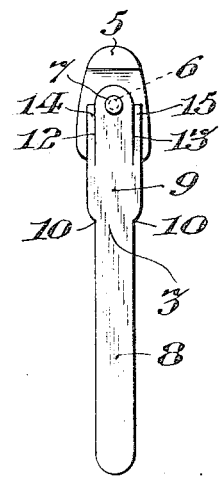
Inventor
Hermann Henry Leuchsenring,

UNITED STATES PATENT OFFICE.

HERMANN HENRY LEUCHSENRING, OF NORWOOD BOROUGH, PENNSYLVANIA, ASSIGNOR TO THE S. S. WHITE DENTAL MANUFACTURING COMPANY, A CORPORATION OF PENNSYLVANIA.

TOOTH SHADE-GUIDE.

1,244,994. Specification of Letters Patent. Patented Oct. 30, 1917.

Application filed April 17, 1916. Serial No. 91,627.

*To all whom it may concern:*

Be it known that I, HERMANN HENRY LEUCHSENRING, a citizen of the United States, and a resident of the borough of Norwood, in the county of Delaware, State of Pennsylvania, have invented certain new and useful Improvements in Tooth Shade-Guides, of which the following is a specification, reference being had to the accompanying drawings.

My invention relates particularly to that class of dental devices commonly known as tooth shade-guides, and employed by dentists in determining by comparison the particular shade of artificial stock teeth that may be substituted for the natural teeth of the patient, and is especially directed to the tooth mountings or tags upon which the individual teeth are pivotally supported.

The principal objects of my invention are, to provide a tooth shade-guide with tooth mountings of such simplified construction as may be cheaply manufactured and so formed as to prevent the accidental rotation of the teeth, and to tensionally hold them at any desired rotatable relation to the mounting, for convenient comparison with the natural teeth in the mouth of the patient.

Other objects of my invention are, to provide a tooth shade-guide having tooth mountings or tags upon which the teeth may be pivoted, and which provide means for frictionally engaging the teeth, so disposed as to balance the teeth and maintain them under tension in proper alined position.

Specifically stated, the form of my invention hereinafter described comprises a tooth shade-guide having tooth mountings to which the teeth are individually pivoted, and which are each provided with lateral spring tines yieldingly bearing against the back of the tooth upon the opposite sides of the pivot, and in spaced relation thereto.

My invention also includes all of the various novel features of construction and arrangement as hereinafter more definitely specified.

In the accompanying drawings, Figure 1 is a front elevational view of a tooth shade-guide, comprising the holder and a plurality of tooth mountings removably carried thereby; Fig. 2 is a plan view of the holder with the tooth mountings removed; Fig. 3 is an enlarged front elevational view of a tooth mounting or tag removed from the holder and showing the tooth mounted thereon in its normal position; Fig. 4 is a side elevational view of the structure shown in Fig. 3; Fig. 5 is a central longitudinal sectional view of the tooth mounting shown in Figs. 3 and 4, showing the tooth in elevation for convenience of illustration; and Fig. 6 is a rear elevational view of the structure shown in Fig. 3.

In said figures, the holder 1, which may be formed in any convenient manner, preferably of sheet material, is provided with suitably spaced elongated apertures 2 arranged to receive the tooth mountings or tags 3, to each of which a tooth 5 is pivoted by means of the pintle 6 which is preferably secured in the tooth and which is rotatably mounted in one end of the mounting 3 and has the head 7 arranged to prevent its displacement from said mounting.

The tooth mounting 3 is provided with an elongated shank 8 of uniform width, arranged to be conveniently received in the apertures 2 provided therefor in the holder 1, and is relatively narrower than the mounting body 9 adjacent to the tooth, to afford shoulders 10 which form abutments arranged to abut against the upper wall of the holder when inserted in any of the apertures 2, as shown in Fig. 1.

The body 9 of the tooth mounting 3 is provided with slits 12 and 13 extending longitudinally therein and forming spring tines 14 and 15 which are bent forwardly, as best shown in Fig. 4, in parallel relation to the plane of said mounting and in frictional engagement with the rear surface of the tooth 5.

It will be obvious that the tooth mounting should be formed of a material which has such flexibility that the tines may tend to bear upon the rear face of the tooth with sufficient tension to prevent it from accidental rotation, so that the operator may forcibly rotate the tooth with respect to its mounting, into any desired angle which may be convenient for comparison with the natural teeth of the patient and so that it will remain in such position until further adjusted.

It may be here noted that a tooth mounting constructed in accordance with my invention provides tines which bear upon the opposite sides of the pivotal axis of the tooth with equal tension, and therefore maintain the tooth in such balance that its rear face is always maintained in parallel relation to the plane of the mounting.

I do not desire to limit my invention to the precise details of construction and arrangement herein set forth, as it is obvious that various modifications may be made therein without departing from the essential features of my invention as defined in the appended claims.

Having thus described my invention, I claim:

1. A tooth shade-guide comprising a tooth support provided with means for pivotally carrying a tooth, and having spring tines engaging said tooth.

2. A tooth shade-guide comprising a tooth support provided with means for pivotally carrying a tooth, and having spring tines engaging said tooth upon opposite sides of the pivot.

3. A tooth shade-guide comprising a tooth support provided with means for pivotally carrying a tooth, and having spring tines extending integrally from said support and engaging said tooth.

4. A tooth shade-guide comprising a tooth support provided with means for pivotally carrying a tooth, and having tines integral with said support and frictionally engaging said tooth in parallel relation with its back face.

5. A tooth shade-guide comprising a tooth support provided with means for pivotally carrying a tooth, and having spring tines engaging said tooth upon opposite sides of the pivot, and a holder adapted to removably receive a plurality of said supports.

6. A tooth shade-guide comprising a tooth support provided with means for pivotally carrying a tooth, and having projections frictionally engaging said tooth.

In witness whereof, I have hereunto set my hand this 14th day of April, A. D. 1916.

HERMANN HENRY LEUCHSENRING.

Witnesses:
WILLIAM J. RUSSELL,
CLIFTON C. HALLOWELL.